(12) United States Patent
Kato et al.

(10) Patent No.: US 8,524,831 B2
(45) Date of Patent: Sep. 3, 2013

(54) POLYVINYL ALCOHOL POLYMER AND METHOD FOR PRODUCING THE SAME

(75) Inventors: Masaki Kato, Tainai (JP); Masato Nakamae, Kurashiki (JP); Yuta Taoka, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/254,299

(22) PCT Filed: Mar. 26, 2010

(86) PCT No.: PCT/JP2010/055446
§ 371 (c)(1),
(2), (4) Date: Sep. 1, 2011

(87) PCT Pub. No.: WO2010/113819
PCT Pub. Date: Oct. 7, 2010

(65) Prior Publication Data
US 2011/0313105 A1 Dec. 22, 2011

(30) Foreign Application Priority Data
Mar. 31, 2009 (JP) .................................. 2009-085057

(51) Int. Cl.
*C08F 16/06* (2006.01)
(52) U.S. Cl.
USPC .................................. 525/60; 525/56; 525/62
(58) Field of Classification Search
USPC .............................................. 525/56, 62, 60
See application file for complete search history.

(56) References Cited

U.S. PATENT DOCUMENTS

| 4,561,725 | A | * | 12/1985 | Hotta | 349/132 |
| 4,772,663 | A | * | 9/1988 | Marten et al. | 525/60 |
| 4,879,144 | A | * | 11/1989 | Nakura et al. | 428/1.25 |
| 5,349,008 | A | | 9/1994 | Takada et al. | |
| 6,046,272 | A | * | 4/2000 | Phung | 525/56 |

FOREIGN PATENT DOCUMENTS

| CN | 101203551 A | 6/2008 |
| JP | 61 041924 | 9/1986 |
| JP | 61 254238 | 11/1986 |
| JP | 10 168128 | 6/1998 |
| JP | 2001 049522 | 2/2001 |
| JP | 2002 356512 | 12/2002 |
| JP | 2004 323775 | 11/2004 |

OTHER PUBLICATIONS

International Search Report issued May 11, 2010 in PCT/JP10/055446 filed Mar. 26, 2010.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

The present invention provides a polyvinyl alcohol polymer having excellent water solubility, compared to conventional polyvinyl alcohol polymers, and having a high cloud point even when the polyvinyl alcohol polymer is partially saponified. The present invention is a polyvinyl alcohol polymer having, at its end, a group represented by the general formula (I) and/or having, in its main chain, a group represented by the general formula (II). In the formulae, R denotes a hydrogen atom or an OM group, and M denotes a hydrogen atom, an alkali metal atom, a 1/2 alkaline earth metal atom, or an ammonium group.

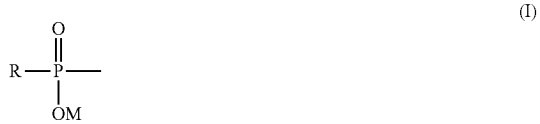

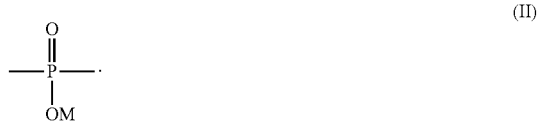

12 Claims, 4 Drawing Sheets

POLYVINYL ALCOHOL POLYMER AND METHOD FOR PRODUCING THE SAME

TECHNICAL FIELD

The present invention relates to a new polyvinyl alcohol polymer and a method for producing the polyvinyl alcohol polymer.

BACKGROUND ART

Polyvinyl alcohol polymers are water soluble and are widely used in various industrial fields. In particular, polyvinyl alcohol polymers are often used as a dispersion stabilizer for suspension polymerization or emulsion polymerization, a dispersant for inorganic substances or organic powders, or the like, because of their surface activity. In the past, various attempts have been made for further enhancing the water solubility or surface activity of the polyvinyl alcohol polymers in such applications. For example, JP 61 (1986)-41924 B discloses a polyvinyl alcohol polymer having a thioalkyl group with 1 to 18 carbon atoms at one end of its main chain, and JP 61 (1986)-254238 A discloses that the above polymer has excellent surface activity and is useful as a dispersion stabilizer for coal-water slurry. Furthermore, JP 10 (1998)-168128 A discloses a polyvinyl alcohol polymer having an ionic group at one end thereof, and describes that it is useful for suspension polymerization of vinyl compounds. However, the above-mentioned polyvinyl alcohol polymers have room for improvement in water solubility, though they are excellent in surface activity.

CITATION LIST

Patent Literatures

Patent Literature 1: JP 61 (1986)-41924 B
Patent Literature 2: JP 61 (1986)-254238 A
Patent Literature 3: JP 10 (1998)-168128 A

SUMMARY OF INVENTION

Technical Problem

It is an object of the present invention to provide a polyvinyl alcohol polymer having excellent water solubility, compared to conventional polyvinyl alcohol polymers, and having a high cloud point even when the polyvinyl alcohol polymer is partially saponified.

Solution to Problem

The present invention that has achieved the above-mentioned object is a polyvinyl alcohol polymer having, at its end, a group represented by the general formula (I) and/or having, in its main chain, a group represented by the general formula (II).

Formula 1:

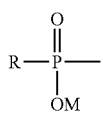

(I)

Formula 2:

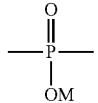

(II)

(In the formulae, R denotes a hydrogen atom or an OM group, and M denotes a hydrogen atom, an alkali metal atom, a 1/2 alkaline earth metal atom, or an ammonium group.)

Further, the present invention is a method for producing a modified polyvinyl alcohol polymer. The method includes the step of subjecting a vinyl ester monomer to radical polymerization in the presence of a phosphorus-containing compound, and the step of subjecting the resultant polymer to saponification.

Advantageous Effects of Invention

The polyvinyl alcohol polymer of the present invention can achieve the effects of having excellent water solubility, compared to conventional polyvinyl alcohol polymers, and having a high cloud point even when the polyvinyl alcohol polymer is partially saponified.

DESCRIPTION OF EMBODIMENTS

Figure 1:
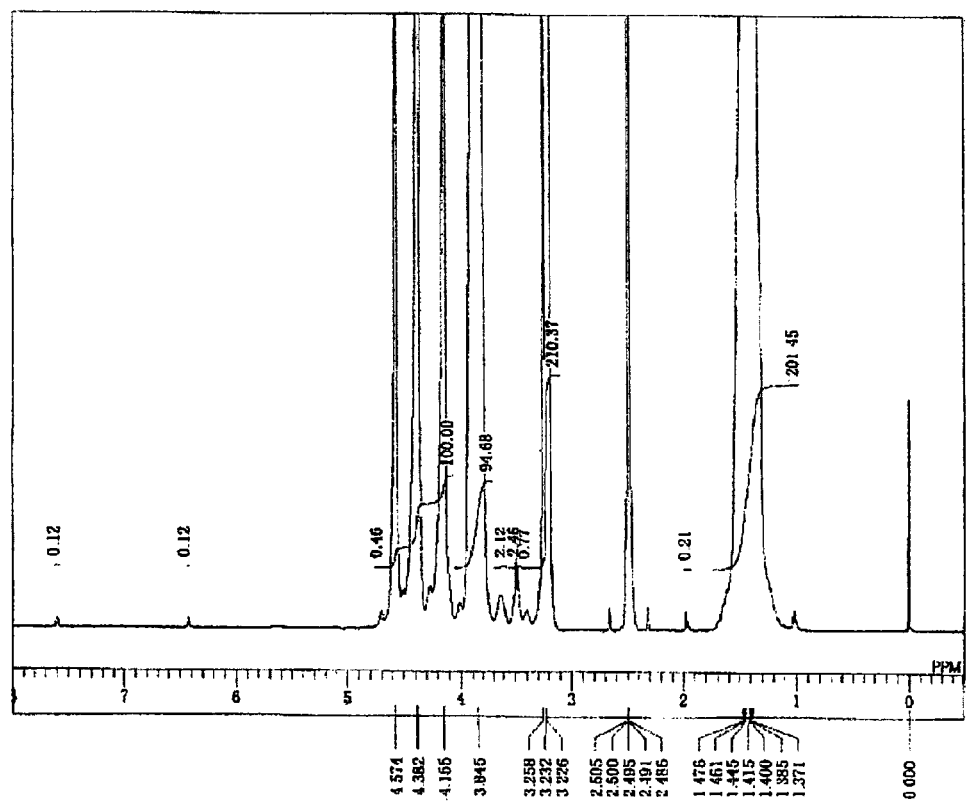
FIG. 1 shows the $^1$H-NMR spectrum of the PVA obtained in Example 1.
Figure 2:
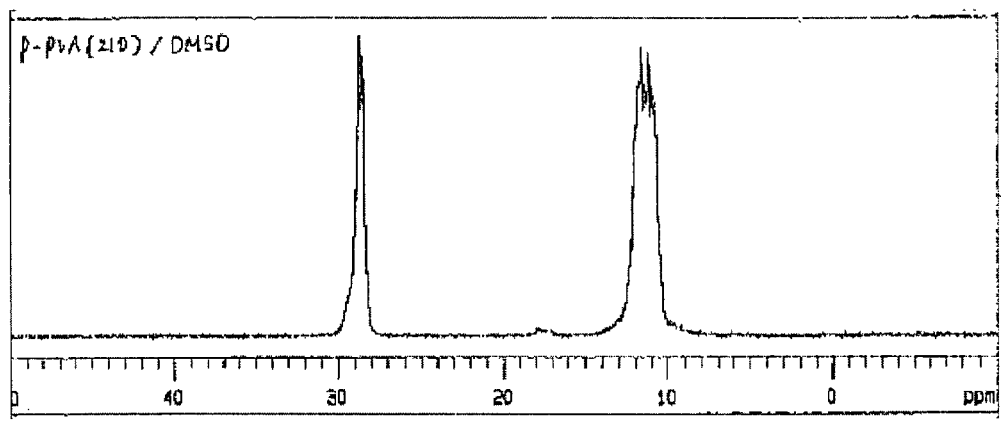
FIG. 2 shows the $^{31}$P-NMR spectrum of the PVA obtained in Example 1.
Figure 3:
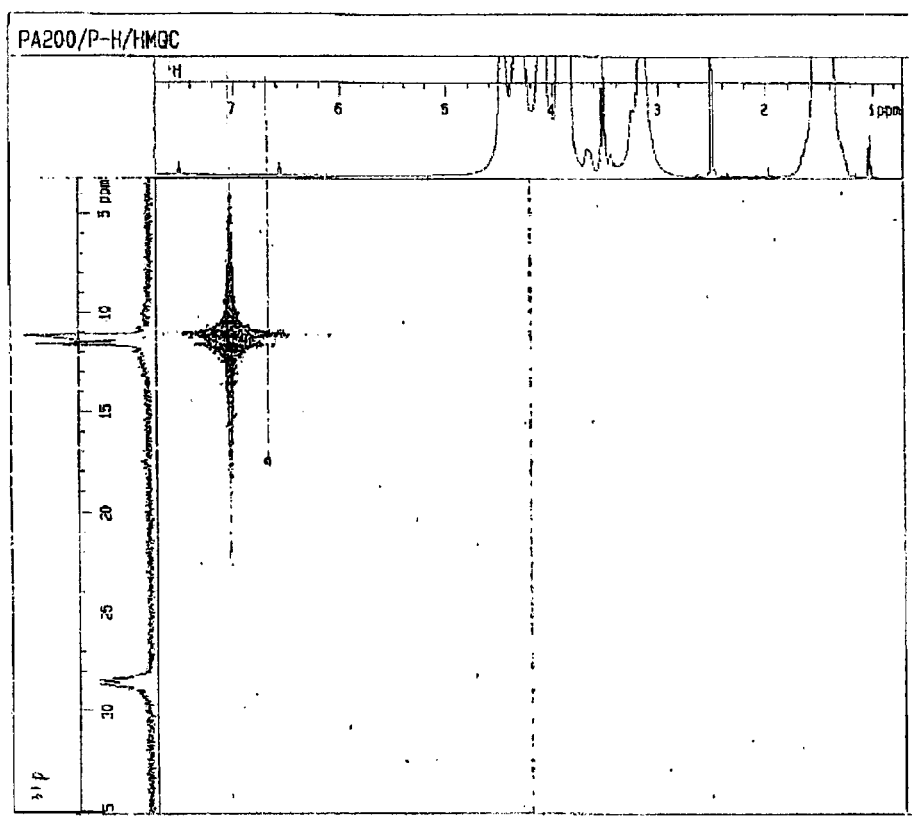
FIG. 3 shows the results of two-dimensional P—H correlation analysis (HMQC: Heteronuclear Multiple Quantum Coherence) for the PVA obtained in Example 1.
Figure 4:
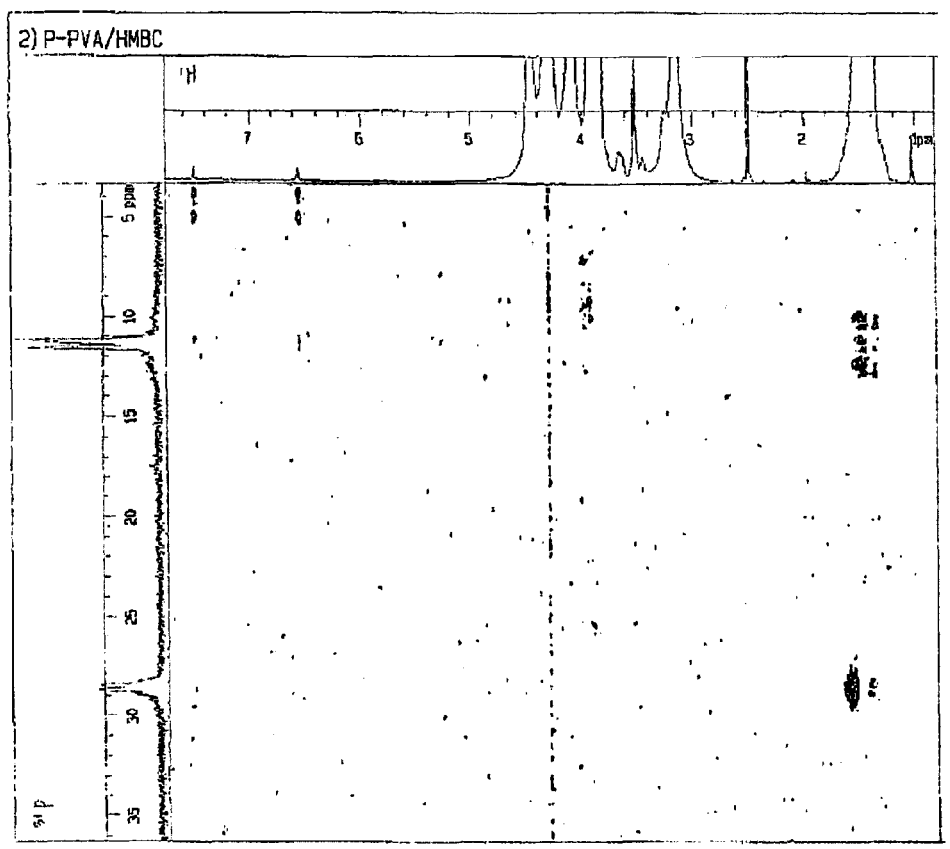
FIG. 4 shows the results of two-dimensional P—H correlation analysis (HMBC: Heteronuclear Multiple Bond Coherence) for the PVA obtained in Example 1.

The polyvinyl alcohol polymer (which may hereinafter be abbreviated as PVA) of the present invention has, at its end, a group represented by the general formula (I) and/or has, in its main chain, a group represented by the general formula (II).

Formula 3:

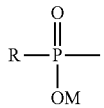

(I)

Formula 4:

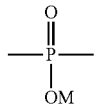

(II)

In the formulae, R denotes a hydrogen atom or an OM group, and M denotes a hydrogen atom, an alkali metal atom, a 1/2 alkaline earth metal atom, or an ammonium group.

Accordingly, the PVA of the present invention includes three aspects of a PVA having, at its end, a group represented by the general formula (I); a PVA having, in its main chain, a group represented by the general formula (II); and a PVA having, at its end, a group represented by the general formula (I) and having, in its main chain, a group represented by the general formula (II).

Examples of the alkali metal atom denoted by M include a sodium atom and a potassium atom. Examples of the 1/2 alkaline earth metal atom denoted by M include a 1/2 magnesium atom and a 1/2 calcium atom. In the case where M denotes a 1/2 alkaline earth metal atom, the remaining 1/2 alkaline earth metal atom (that is, the other bond of the bivalent alkaline earth metal atom) may be bonded to the oxygen atom in the general formula (I), the oxygen atom in the general formula (II), $P(H_2O_2)$, or the like.

The PVA of the present invention includes a vinyl alcohol unit, and a group represented by the general formula (I) and/or a group represented by the general formula (II), in its molecule. It may further include a vinyl ester monomer unit derived from the vinyl ester monomer used for producing the PVA. That is, the PVA of the present invention may be a partially saponified PVA. The PVA of the present invention may further include a monomer unit that is copolymerizable with the vinyl ester monomer. The vinyl ester monomer and the monomer that is copolymerizable with the vinyl ester monomer will be described later.

The saponification degree of the PVA of the present invention is not particularly limited as long as the PVA is water soluble and water dispersible. However, the saponification degree thereof is preferably at least 5 mol %, more preferably at least 7 mol %, further preferably at least 10 mol %. The upper limit of the saponification degree is not particularly limited. If the saponification degree falls below 5 mol %, the water solubility of the PVA decreases, which might render the preparation of a PVA aqueous solution difficult.

The average polymerization degree (hereinafter, simply referred to as polymerization degree) of the PVA of the present invention is preferably 10 to 3000. If the polymerization degree exceeds 3000 or falls below 10, the productivity of the PVA decreases, which might reduce the practicality. It should be noted that the polymerization degree of the PVA means the viscosity average polymerization degree, and can be determined, for example, according to JIS K6726. That is, the polymerization degree can be calculated by the following formula from the intrinsic viscosity [η], as measured at 30° C. in water after the PVA is re-saponified to a saponification degree of at least 99.5 mol % and then purified.

$$P=([\eta]\times1000/8.29)^{(1/0.62)}$$

A method for producing the PVA of the present invention is not particularly limited as long as the PVA to be obtained has, at its end, a group represented by the general formula (I) and/or has, in its main chain, a group represented by the general formula (II). For example, it is possible to produce it by a method including the step of subjecting a vinyl ester monomer to radical polymerization in the presence of a phosphorus-containing compound, and the step of subjecting the resultant polymer to saponification.

Examples of the vinyl ester monomer include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Above all, vinyl acetate is most preferable.

Examples of the phosphorus-containing compound include hypophosphorous acid compounds such as hypophosphorous acid, sodium hypophosphite, potassium hypophosphite, calcium hypophosphite, magnesium hypophosphite, ammonium hypophosphite, and hydrates thereof. From the industrial viewpoint, sodium hypophosphite or hydrate thereof, which costs least, can be used suitably.

The amount of the phosphorus-containing compound to be used is not particularly limited. It can be appropriately determined, depending on the amount of the group represented by the general formula (I) and the amount of the group represented by the general formula (II) that are intended to be introduced into the PVA. The amount of the phosphorus-containing compound to be used is preferably 0.001 to 30 parts by weight with respect to 100 parts by weight of the vinyl ester monomer.

The polymerization of the vinyl ester monomer can be carried out in the presence of a solvent such as an alcohol solvent, or in the absence of a solvent.

The polymerization process to be employed for the polymerization of the vinyl ester monomer may be any one of batch polymerization, semi-batch polymerization, continuous polymerization, and semi-continuous polymerization. As a polymerization method, known methods such as bulk polymerization, solution polymerization, suspension polymerization, and emulsion polymerization can be used arbitrarily. Among these, bulk polymerization or solution polymerization where the polymerization is carried out in the absence of a solvent or in the presence of an alcohol solvent is suitably employed. In the case where a polymer having a high polymerization degree is supposed to be produced, emulsion polymerization is employed. Examples of the alcohol solvent to be used include, but not restricted to, methyl alcohol, ethyl alcohol, and propyl alcohol. Further, two or more of these solvents may be mixed to be used. An initiator to be used for the polymerization may be appropriately selected, corresponding to the polymerization method, from an azo initiator, a peroxide initiator, and a redox initiator that are conventionally known, for example. Examples of the azo initiator include 2,2'-azobisisobutyronitrile, 2,2'-azobis(2,4-dimethylvaleronitrile), and 2,2'-azobis(4-methoxy-2,4-dimethylvaleronitrile). Examples of the peroxide initiator include percarbonate compounds such as diisopropyl peroxydicarbonate, di-2-ethylhexyl peroxydicarbonate, and diethoxyethyl peroxydicarbonate; perester compounds such as t-butyl peroxyneodecanoate, α-cumyl peroxyneodecanoate, and t-butyl peroxydecanoate; acetyl cyclohexyl sulfonyl peroxide; and 2,4,4-trimethylpentyl-2-peroxyphenoxyacetate. Further, it also is possible to combine potassium persulfate, ammonium persulfate, hydrogen peroxide, or the like, with the above-mentioned initiators for use as an initiator. Examples of the redox initiator include a combination of the above-mentioned peroxides with a reductant such as sodium bisulfate, sodium hydrogencarbonate, tartaric acid, L-ascorbic acid, and Rongalite. It should be noted that, in the case where coloration of the PVA or the like is observed due to degradation of the vinyl ester monomer when the polymerization of the vinyl ester monomer is carried out at a high temperature, it does not matter if about 1 to 100 ppm (with respect to the vinyl ester monomer) of an antioxidant such as tartaric acid is added to the polymerization system in order to prevent such coloration.

The temperature to be employed for the polymerization of the vinyl ester monomer is preferably 0 to 200° C., more preferably 30 to 140° C. If the polymerization temperature falls below 0° C., a sufficient polymerization rate cannot be achieved, which is therefore not preferable. On the other hand, if the polymerization temperature exceeds 200° C., the desired PVA is difficult to obtain, which is therefore not preferable. As a method for controlling the temperature employed for the polymerization to 0 to 200° C., there are, for example, a method of balancing heat generated due to polymerization with heat radiated from the surface of the reactor by controlling the polymerization rate, and a method of using an outer jacket provided with an appropriate heat medium. In view of safety, the latter method is preferable.

In the present invention, the vinyl ester monomer may be polymerized under higher temperature conditions, so that a PVA having a high content of 1,2-glycol bond than usual should be obtained. In this case, the content of 1,2-glycol bond is preferably at least 1.9 mol %, more preferably at least 2.0 mol %, further preferably at least 2.1 mol %.

There is no problem if the vinyl ester monomer is copolymerized with another monomer when being polymerized, as long as the effects of the present invention are not impaired. Examples of the monomer that is copolymerizable with the vinyl ester monomer include α-olefin such as ethylene, propylene, n-butene, and isobutylene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide; acrylamide derivatives such as N-methyl acrylamide, N-ethyl acrylamide, N,N-dimethyl acrylamide, diacetoneacrylamide, acrylamide propanesulfonic acid and salts thereof, acrylamide propyl dimethyl amine and salts thereof or quaternary salts thereof, and N-methylol acrylamide and derivatives thereof, methacrylamide; methacrylamide derivatives such as N-methyl methacrylamide, N-ethyl methacrylamide, methacrylamide propanesulfonic acid and salts thereof, methacrylamide propyl dimethyl amine and salts thereof or quaternary salts thereof, and N-methylol methacrylamide and derivatives thereof vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile, and methacrylonitrile; vinyl halides such as vinyl chloride, and vinyl fluoride; vinylidene halides such as vinylidene chloride, and vinylidene fluoride; allyl compounds such as allyl acetate, and allyl chloride; unsaturated dicarboxylic acids such as maleic acid, itaconic acid, and fumaric acid, and salts or esters thereof, vinylsilyl compounds such as vinyl trimethoxysilane; oxyalkylene group-containing monomers such as polyoxyethylene (meth)acrylate, polyoxypropylene (meth)acrylate, polyoxyethylene (meth)acrylic acid amide, polyoxypropylene (meth)acrylic acid amide, polyoxyethylene (1-(meth)acrylamide-1,1-dimethylpropyl) ester, polyoxyethylene (meth)allyl ether, polyoxypropylene (meth)allyl ether, polyoxyethylene vinyl ether, and polyoxypropylene vinyl ether; and isopropenyl acetate.

Further, when the vinyl ester monomer is polymerized, it does not matter if the polymerization is carried out in the presence of a chain transfer agent, for example, in order to adjust the polymerization degree of the PVA to be obtained, as long as the effects of the present invention are not impaired. Examples of the chain transfer agent include aldehydes such as acetaldehyde, and propionaldehyde; ketones such as acetone, and methyl ethyl ketone; mercaptans such as 2-hydroxyethanethiol, n-dodecane thiol, and 3-mercaptopropionic acid; and halides such as tetrachloromethane, bromotrichloromethane, trichloroethylene, and perchloroethylene.

A vinyl ester (co)polymer incorporating a phosphorus-containing compound into its main chain and/or its end can be obtained by polymerizing the vinyl ester monomer in the presence of the phosphorus-containing compound.

For saponification of the vinyl ester polymer, alcoholysis or hydrolysis using acidic catalysts such as p-toluenesulfonic acid or basic catalysts such as sodium hydroxide, potassium hydroxide, and sodium methoxide that are conventionally known can be employed. Examples of the solvent that can be used for such a reaction include alcohols such as methanol, and ethanol; esters such as methyl acetate, and ethyl acetate; ketones such as acetone, and methyl ethyl ketone: and aromatic hydrocarbons such as benzene, and toluene. One of them can be used individually, or two or more of them can be used in combination. Above all, since saponification can be carried out easily and conveniently, it is preferable to use a solvent of methanol, or a mixed solvent of methanol and methyl acetate, with sodium hydroxide as a catalyst.

According to the above method, a PVA having, at its end, a group represented by the general formula (I), a PVA having, in its main chain, a group represented by the general formula (II), and a PVA having, at its end, a group represented by the general formula (I) and having, in its main chain, a group represented by the general formula (II) can be obtained in the form of a mixture.

In such a mixture, the amount of modification by the group represented by the general formula (I) is preferably 0.01 to 18 mol %. If it falls below 0.01 mol %, there is a possibility that the polymerization degree exceeds 3000 and, in that case, the productivity of the PVA decreases, resulting in a reduction in practicality. If it exceeds 18 mol %, there is a possibility that the polymerization degree falls below 10 and, in that case, the productivity of the PVA decreases, resulting in a reduction in practicality. The amount of the modification can be determined by a $^1$H-NMR measurement.

Further, in such a mixture, the mole ratio of the group represented by the general formula (I) to the group represented by the general formula (II) preferably satisfies: (General formula (I))/(General formula (II))=5/5 to 9/1, in view of the productivity of the PVA, though not specifically limited thereto. The mole ratio can be determined by a $^{31}$P-NMR measurement.

The present invention provides a polyvinyl alcohol polymer having excellent water solubility, compared to conventional polyvinyl alcohol polymers, and having a high cloud point even when the polyvinyl alcohol polymer is partially saponified.

EXAMPLES

Hereinafter, the present invention is described in detail with reference to the examples and comparative examples. However, the present invention is not limited to these examples. It should be noted that the percentages given in the following examples and comparative examples are percentages by weight, unless otherwise specified.

Example 1

Production of PVA 300 g of methanol and 2.0 g of sodium phosphinate (sodium hypophosphite) monohydrate were put into a reactor, so that a methanol solution of sodium phosphinate monohydrate was prepared. Then, 1200 g of vinyl acetate was put into a reactor, and the inside of the reactor was substituted with nitrogen by nitrogen gas bubbling. Heating of the reactor was started, and at the time when the internal temperature had reached 60° C., 0.3 g of 2,2'-azobisisobutyronitrile was added to the reactor to start the polymerization. During the polymerization, the polymerization temperature was maintained at 60° C. The reactor was cooled 4 hours later, at the time when the polymerization conversion had reached 50%, so that the polymerization was stopped. Then, unreacted vinyl acetate was removed under reduced pressure. Thus, a methanol solution of polyvinyl acetate (PVAc) was obtained. To the PVAc solution adjusted to 40% was added a NaOH methanol solution (10% concentration) so that the mole ratio of alkali (the number of moles of NaOH/the number of moles of vinyl ester units in the PVAc) should be 0.03, thus causing saponification. By the above operation, a PVA having a saponification degree of 98.5 mol % was obtained. The viscosity average polymerization degree of the PVA was 760, as determined according to JIS K6726.

After being purified by 48 hours of Soxhlet extraction with methanol, the above-mentioned PVA was dissolved in $d_6$-DMSO. It was analyzed using $^1$H-NMR (JEOL GX-500) at 500 MHz. As a result, protons derived from protons (P—H) of phosphinic acid at the end of the PVA were observed in the range of δ=7.5 to 7.7 ppm and of 6.3 to 6.6 ppm, and it was confirmed that the PVA had, at its end, a group represented by the formula (I). Further, the PVA purified by the above-mentioned method was dissolved in $d_6$-DMSO, and it was analyzed using $^{31}$P-NMR at 203 MHz. As a result, two types of signals were observed at 10 to 13 ppm and 28 to 30 ppm (the signal arising from Na phosphinate monohydrate was taken as 0 ppm). Furthermore, two-dimensional P—H correlation analyses (HMQC and HMBC) were carried out. As a result of HMQC, a correlation was found between the $^{31}$P-NMR signal at 10 to 13 ppm and the $^1$H-NMR signals at 7.5 to 7.7 ppm and 6.3 to 6.6 ppm (which arise from the protons (P—H) of phosphinic acid located at the end of the PVA). However, no correlation (P—H bond) with directly bonded protons was found for the $^{31}$P-NMR signal at 28 to 30 ppm. These results demonstrated the presence of modified P not only at the end but also in the main chain. On the other hand, as a result of HMBC, a correlation was found for both $^{31}$P-NMR signals with the $^1$H-NMR signal at 1.1 to 1.9 ppm (which arises from methylene in the PVA). These results demonstrated not only the presence of a PVA having, at its end, a group represented by the formula (I), but also the presence of a PVA having, in its main chain, a group represented by the formula (II).

In addition, the amount of modification by the group represented by the general formula (I) was determined from the results of the $^1$H-NMR analysis. Specifically, the amount of modification by the group represented by the general formula (I) was calculated from the area α of the peak (1.1 to 1.9 ppm) arising from methylene in the main chain of the PVA and the area β of the peaks (7.5 to 7.7 ppm and 6.3 to 6.6 ppm) arising from protons attached to phosphorus in the group represented by the general formula (I), using the following formula:

Modification amount (mol %) by the group represented by the general formula (I)={(Peak area β)/((Peak area α/2)+(Peak area β))}×100.

Moreover, the mole ratio of the group represented by the general formula (I) and the group represented by the general formula (II) in the PVA was calculated from the peak area ratio of the peak (10 to 13 ppm) arising from phosphorus in the group represented by the general formula (I) and the peak (28 to 30 ppm) arising from phosphorus in the group represented by the general formula (II) on the basis of the results of the $^{31}$P-NMR analysis.

<Measurement of Cloud Point>

While a 0.4 wt % aqueous solution of the PVA was heated from 20° C. to 70° C., the temperature at which the transmittance at a wavelength of 500 nm reached 85% was measured, with the optical path length of the measurement sample set to 1 cm, using a UV spectrophotometer (UV2100; manufactured by SHIMADZU CORPORATION). The measured temperature was taken as a cloud point.

Example 2

A PVA was obtained in the same manner as in Example 1 except that the amount of sodium hydroxide used for saponification in Example 1 was changed. Table 1 shows the synthesis conditions and evaluation results.

Example 3

A PVA was obtained in the same manner as in Example 1 except that the amount of sodium phosphinate monohydrate and the amount of methanol used for polymerization, and the amount of sodium hydroxide used for saponification, in Example 1, were changed. Table 1 shows the synthesis conditions and evaluation results.

Example 4

A PVA was obtained in the same manner as in Example 1 except that the amount of sodium phosphinate monohydrate used for polymerization and the concentration of the PVAc used for saponification, in Example 1, were changed. Table 1 shows the synthesis conditions and evaluation results.

Comparative Example 1

A PVA was obtained in the same manner as in Example 1, but using 3-mercaptopropionic acid instead of sodium phosphinate monohydrate, under the polymerization conditions and saponification conditions shown in Table 1. Table 1 shows the evaluation results.

Comparative Example 2

A PVA was obtained in the same manner as in Example 1, but using no sodium phosphinate in polymerization, under polymerization conditions and saponification conditions shown in Table 1. Table 1 shows the evaluation results.

TABLE 1

| | Polymerization conditions | | | | Saponification conditions | |
|---|---|---|---|---|---|---|
| | Vinyl acetate (g) | Methanol (g) | Modification type (g) | Polymerization conversion (%) | PVAc concentration (%) | NaOH mol ratio[1] |
| Ex. 1 | 1200 | 300 | Sodium phosphinate monohydrate 2 | 50 | 40 | 0.0300 |
| Ex. 2 | 1200 | 300 | Sodium phosphinate monohydrate 2 | 50 | 40 | 0.0050 |

TABLE 1-continued

| | Viscosity average polymerization degree | Saponification degree (mol %) | Modification type | Modification amount by general formula (I) (mol %) | Ratio (mol) of modification amount of general formula (I)/ general formula (II) | Evaluation of solubility Cloud point of aqueous solution (° C.) |
|---|---|---|---|---|---|---|
| Ex. 3 | 1200 | 500 | Sodium phosphinate monohydrate | 5 | 50 | 40 | 0.0047 |
| Ex. 4 | 1200 | 300 | Sodium phosphinate monohydrate | 1 | 50 | 30 | 0.0300 |
| C. Ex. 1 | 1200 | 300 | 3-mercaptopropionic acid[3] | 1.2 | 35 | 40 | 0.0066 |
| C. Ex. 2 | 1200 | 2800 | none | — | 70 | 40 | 0.0046 |

Analyses results

| | Viscosity average polymerization degree | Saponification degree (mol %) | Modification type | Modification amount by general formula (I) (mol %) | Ratio (mol) of modification amount of general formula (I)/ general formula (II) | Evaluation of solubility Cloud point of aqueous solution (° C.) |
|---|---|---|---|---|---|---|
| Ex. 1 | 760 | 98.5 | Phosphinic acid | 0.15 | 8/2 | 70° C. or more |
| Ex. 2 | 760 | 70.8 | Phosphinic acid | 0.15 | 8/2 | 70° C. or more |
| Ex. 3 | 360 | 74.0 | Phosphinic acid | 0.35 | 7/3 | 70° C. or more |
| Ex. 4 | 960 | 98.5 | Phosphinic acid | 0.09 | 8.5/1.5 | 70° C. or more |
| C. Ex. 1 | 750 | 70.8 | Carboxylic acid | 0.16 | — | 42° C. |
| C. Ex. 2 | 360 | 74.5 | — | — | — | 38° C. |

[1]Mole ratio of sodium hydroxide (NaOH) with respect to vinyl acetate units in PVAc
[2]0.25 g of 2,2'-azobisisobutyronitrile (AIBN) was used as a polymerization initiator in all the production examples.
[3]3-mercaptopropionic acid was successively added.

INDUSTRIAL APPLICABILITY

The polyvinyl alcohol polymer of the present invention has excellent water solubility, compared to conventional polyvinyl alcohol polymers, and a high cloud point even when the polyvinyl alcohol polymer is partially saponified. Thus, the industrial evaluation thereof is very high.

The invention claimed is:

1. A polyvinyl alcohol polymer, comprising:
(i) at its end, a group represented by formula (I):

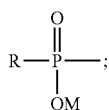

(ii) in its main chain, a group represented by formula (II):

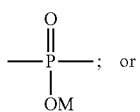

(iii) the group of formula (I) and the group of formula (II), wherein
R represents a hydrogen atom or an OM group; and
M represents a hydrogen atom, an alkali metal atom, a 1/2 alkaline earth metal atom, or an ammonium group.

2. The polyvinyl alcohol polymer according to claim 1, having an average polymerization degree of 10 to 3000.

3. The polyvinyl alcohol polymer according to claim 1, further comprising a vinyl ester monomer unit derived from a vinyl ester monomer used for producing the polyvinyl alcohol polymer.

4. The polyvinyl alcohol polymer according to claim 3, wherein the polymer is at least partially saponified.

5. The polyvinyl alcohol polymer according to claim 3, further comprising a monomer unit that is copolymerizable with the vinyl ester monomer.

6. The polyvinyl alcohol polymer according to claim 5, wherein a monomer forming the monomer unit that is copolymerizable with the vinyl ester monomer is at least one selected from the group consisting of an α-olefin, acrylic acid, a salt of acrylic acid, an acrylic ester, methacrylic acid, a salt of methacrylic acid, a methacrylic ester, acrylamide, an acrylamide derivative, methacrylamide, a methacrylamide derivative, a vinyl ether, acrylonitrile, methacrylonitrile, a vinyl halide, an allyl compound, an unsaturated dicarboxylic acid, a vinyl silyl compound, and an oxyalkylene group-containing monomer.

7. The polyvinyl alcohol polymer according to claim 3, wherein the vinyl ester monomer is at least one selected from the group consisting of vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate.

8. The polyvinyl alcohol polymer according to claim 3, wherein the vinyl ester monomer is vinyl acetate.

9. The polyvinyl alcohol polymer according to claim 1, comprising the group (i) represented by formula (I).

10. The polyvinyl alcohol polymer according to claim 1, comprising the group (ii) represented by formula (II).

11. The polyvinyl alcohol polymer according to claim 1, comprising both the group (i) represented by formula (I) and the group (ii) represented by formula (II).

12. The polyvinyl alcohol polymer according to claim 11, wherein a mole ratio of the group (i) represented by formula (I) to the group (ii) represented by formula (II) ranges from 5/5 to 9/1.

* * * * *